US011812700B2

(12) United States Patent
Nona et al.

(10) Patent No.: US 11,812,700 B2
(45) Date of Patent: Nov. 14, 2023

(54) HIGH DENSITY PLUNGER MOVEMENT

(71) Applicant: CNH Industrial America LLC, New Holland, PA (US)

(72) Inventors: Kenny Nona, Linden (BE); Didier Verhaeghe, Ypres (BE); Tom Coen, Zemst (BE)

(73) Assignee: CNH Industrial America LLC, New Holland, PA (US)

( * ) Notice: Subject to any disclaimer, the term of this patent is extended or adjusted under 35 U.S.C. 154(b) by 1083 days.

(21) Appl. No.: 16/404,188

(22) Filed: May 6, 2019

(65) Prior Publication Data

US 2019/0335670 A1  Nov. 7, 2019

(30) Foreign Application Priority Data

May 4, 2018 (BE) .................................. 2018/5290

(51) Int. Cl.
*A01F 15/04* (2006.01)
*A01F 15/08* (2006.01)

(52) U.S. Cl.
CPC .......... *A01F 15/046* (2013.01); *A01F 15/042* (2013.01); *A01F 15/0825* (2013.01)

(58) Field of Classification Search
CPC ...... A01F 15/04; A01F 15/042; A01F 15/046; A01F 15/08; A01F 15/0825; A01F 2015/102; A01F 15/10; B30B 9/3025
See application file for complete search history.

(56) References Cited

U.S. PATENT DOCUMENTS

| | | | |
|---|---|---|---|
| 4,624,190 A | 11/1986 | Cappi | |
| 6,112,507 A * | 9/2000 | Mesmer | A01F 15/0825 100/88 |
| 6,257,131 B1 | 7/2001 | Wilkens et al. | |
| 9,844,187 B2 * | 12/2017 | Demon | B30B 9/3025 |
| 2010/0224085 A1* | 9/2010 | Hoover | A01F 15/0825 100/76 |
| 2012/0186466 A1 | 7/2012 | Vande Ryse et al. | |

(Continued)

FOREIGN PATENT DOCUMENTS

| | | |
|---|---|---|
| DE | 19640061 A1 | 4/1996 |
| EP | 0346586 A2 | 4/1989 |
| EP | 0908089 A1 | 4/1999 |

(Continued)

*Primary Examiner* — Jimmy T Nguyen
(74) *Attorney, Agent, or Firm* — Peter Zacharias (57) ABSTRACT

An agricultural baler with a pre-compression chamber configured to introduce a slice towards a baling chamber. The baling chamber includes a plunger provided for reciprocally moving in the baling chamber, the reciprocal movement having a power movement. In use, during the power movement, slices of crop material are compressed into a bale and the bale is pushed through the baling chamber. The baling chamber further includes at least one movable wall for exercising a compression force to the crop material in a direction transverse to the propelling movement so that, in use, the at least one movable wall provides a counter pressure for the propelling through the baling chamber of the bale. The agricultural baler further includes a controller adapted to influence a compression force of the at least one movable wall at a predetermined moment of the power movement to reduce the counter pressure.

15 Claims, 6 Drawing Sheets

(56) References Cited

U.S. PATENT DOCUMENTS

2015/0272006 A1* 10/2015 Demon .............. A01F 15/0825
700/275
2016/0120129 A1    5/2016 Verhaeghe et al.

FOREIGN PATENT DOCUMENTS

| EP | 2712496 A1 | 4/2014 |
| EP | 3117699 A1 | 1/2017 |
| EP | 3245862 A1 | 11/2017 |
| WO | 2013017229 A1 | 2/2013 |
| WO | 2013045105 A1 | 4/2013 |
| WO | 2013053489 A1 | 4/2013 |

* cited by examiner

PRIOR ART

HIGH DENSITY PLUNGER MOVEMENT

FIELD OF THE INVENTION

The present invention relates to an agricultural baler. More specifically, the present invention relates to a square agricultural baler, which is provided for gathering crop material, forming slices of crop material from the gathered crop material, and pressing square bales from the slices.

BACKGROUND OF THE INVENTION

Agricultural balers typically comprise two main parts used in the formation of the bales, being a pre-compression chamber and a baling chamber. Crop material is gathered and pushed into the pre-compression chamber, where a slice of crop material is formed. Pre-compression chamber is linked to the baling chamber in such a manner that the slice of crop material can periodically be transferred into the baling chamber. In the baling chamber, a plunger reciprocally moves, thereby pressing a square bale from subsequently fed slices.

The plunger movement is powered via a main shaft driven by a motor. Thereby, the motor can be a part of the baler, or can be a part of the puller (tractor) connected to the baler via a power take-off (PTO). In practice, this reciprocal movement of the plunger is often considered the most dominant movement in the baler, dominant meaning that other movements are made relative to this movement of the plunger. The reason is that the plunger movement requires the highest force (highest relative to other forces needed for operating the baler) and takes up most of the power.

The pre-compression chamber is adapted for receiving gathered crop material. To this end, the pre-compression chamber has an inlet. The pre-compression chamber furthermore includes an outlet towards the baling chamber. Between the inlet and the outlet, a channel is defined in which crop material can gather into a slice of crop material. The pre-compression chamber comprises a slice pushing mechanism, so-called stuffer, provided for pushing a slice of crop material formed in the pre-compression chamber through the outlet of the pre-compression chamber into the baling chamber. The sliced crop material is typically pushed in a first segment of the baling chamber. First segment is typically located directly behind the plunger (the plunger being in the withdrawn position). Thereby the slice of crop material is pushed in the baling chamber, after which the plunger can propel the crop material into the baling chamber, thereby pushing the most recently entered slice into the baling chamber, making it a part of the square bale which is being formed.

The pre-compression chamber comprises, for the purpose of pushing the slice into the baling chamber, a slice pushing mechanism. Different types of slice pushing mechanisms are known, among which fingers grasping behind the slice and pushing the slice through the outlet, or a set of conveyor belts in between which the slice is formed, and which conveyor belts are driven to push the slice through the outlet.

The slice pushing mechanism is driven via a driving mechanism that is operationally linked to the plunger driving mechanism. A synchronized movement between the slice pushing mechanism and the plunger is needed to ensure a proper operation of the baler. Namely, only when the plunger is withdrawn, a slice can be pushed in the baling chamber. In practice, different synchronization types are possible among which a one/one synchronization, meaning that every withdrawal of the plunger a new slice is entered into the baling chamber, or a one/two synchronization, meaning that every other withdrawal of the plunger a new slice is entered, thus the plunger moves forth and back two times for each slice. Other synchronization timing such as one/three, one/four, . . . are also possible.

Synchronization is in practice often realized by mechanically linking the plunger driving mechanism and the slice pushing driving mechanism. Such mechanical link ensures proper synchronization, as the slice pushing mechanism is mechanically driven by the plunger movement, it cannot move out of synchronization. The synchronization can be variable using known techniques so that the timing can be adapted, while still having a connection between the plunger driving mechanism and the slice pushing driving mechanism.

In practice, there is an inverse relationship between the quantity of bale material to be compressed on each compression stroke of the plunger and the maximum level of compression of the bale material and the density of the bale. If a large quantity of material is fed into the bale chamber this will result in a large slice thickness and a low level of compression, and therefore a low density. On the other hand, if a small quantity of bale material is fed into the bale chamber on each stroke this will result in a small wad thickness and a high maximum level of compression, and therefore a high density. As the throughput of the baling machine (that is, the rate in kg/hour at which material is compressed) depends on the amount of bale material compressed per stroke of the plunger, there is also an inverse relationship between the throughput of the baler and the density of the bale. The operator therefore has to choose either a high throughput and a low density, or a low throughput and a high density.

Another relevant aspect in the operation of the known balers relates to so called top fill and so called left-right fill. Top fill and left-right fill are a measure for the uniformity of the slice after it has entered the first segment of the baling chamber. It will be recognized that a non uniform fill, for example where the lower part of the first segment is more dense than an upper part, or the left part of the first segment is more dense than the right part, results in an inferior bale. Such top fill has an effect that a bale is high dense at lower end, and not dense at the top, resulting in an unstable bale that is likely to show a substantial deviation from the ideal square form. A negative top fill also results in a substantial wear of the plunger and baling chamber, as forces are not equally transmitted. The plunger will feel a substantially higher resistance at the lower part of the plunger compared to the upper part resistance of the plunger. This will create a torque force exerted to the plunger which has to be borne by the plunger driving mechanism. When the ideal top fill can be obtained, a bale can be formed with nearly ideal outer dimensions and shape, and excessive wear on the baler mechanism can be avoided.

For the economical use of trucks for transporting the bales, bales of a high density are required. However, for fast processing of the bale material, a high throughput is required. This creates a dilemma for the operator, which has to compromise on the throughput of the baler and/or the bale density. With a prior art baler a higher density can only be achieved at high throughput by strengthening the gearbox or adding an additional drive means for driving the compressed bale material towards the outlet end of the channel during successive compression cycles of the plunger, which adds to the cost of the baler.

It is an object of the invention to increase the density of the bale without significantly affecting the throughput of the baler and without excessive load on the plunger driving mechanism.

SUMMARY OF THE INVENTION

To this end, the invention provides an agricultural baler comprising a baling chamber and a pre-compression chamber, wherein the pre-compression chamber is adapted to gather crop material and to periodically form a slice of said crop material and introduce the slice towards the baling chamber into a first segment of the baling chamber, the baling chamber comprising a plunger provided for reciprocally moving in the baling chamber, the reciprocal movement having a power movement and a retraction movement, wherein in use, during the power movement, slices of crop material are compressed into a bale and the bale is pushed through the baling chamber, the baling chamber further comprising at least one movable wall for exercising a compression force to the crop material in a direction transverse to the propelling movement so that, in use, the at least one movable wall provides a counter pressure for the propelling through the baling chamber of the bale, the agricultural baler further comprising a controller adapted to influence said compression force at a predetermined moment of the power movement to reduce said counter pressure.

The invention is based on the insight that during the power movement of the plunger, a force peak is related to the initialisation of the propelling movement of the bale through the baling chamber. The counter force against the propelling through the baling chamber of the bale is generated by the at least one movable wall. The at least one movable wall compresses the sides of the bale such that a friction force is obtained between the bale and the walls of the baling chamber. The invention is further based on the insight that once the propelling of the bale is initiated in the baling chamber, the density of the bale thus does not increase anymore. By adjusting the position of the at least one movable wall to reduce the transverse compression on the bale, the force necessary to initialize the propelling through the bale chamber of the bale is reduced. It has been surprisingly found that this releasing of compression force during the power movement does not significantly affect the density of the bale so that a high density can still be reached. The force peak necessary to initiate the propelling of the bale through the baling chamber can thus be reduced while the high density is maintained.

Desirably, the predetermined moment is related to the moment where the power movement initiates the propelling through the baling chamber of the bale. In other words, the moment at which the bale should be held less strong, is related to the moment where the power movement initiates the propelling of the bale through the baling chamber. By relating the predetermined moment to the moment where the power movement initiates the power through the baling chamber of the bale, the force for initiating the propelling of the bale is reduced. At this moment, the density of the bale is already substantially maximised, so that the reducing of lateral compression does not affect the density. This reduces the maximum force that is to be transmitted by the plunger to the bale while keeping the density of the bale high.

Desirably, the predetermined moment is related to the moment where the compression of the slices of crop material into the bale reaches a predetermined density. The predetermined density is desirably the high density that is desired for the bale. When this predetermined density is reached, the at least one movable wall can be moved to reduce counter pressure against propelling through the baling chamber of the bale, such that the bale can start moving more easy, without a force peak applied by the plunger.

Desirably, the compression forces are influenced by reducing the compression force over a predetermined limited period of time with a predetermined limited compression reduction. The predetermined limited period of time is desirably smaller than the time needed by the plunger, starting from the predetermined moment, to finish the power movement. The compression reduction can be considered a burst like or tamper like reduction which is short in time and which only aims to bridge the time period wherein propelling through the bale chamber of the bale is initialized. After initialization, during the propelling through the baling chamber of the bale, the compression force exerted by the at least one movable wall is desirably restored. The predetermined limited compression reduction is determined to reduce the force needed by the plunger to initialize the propelling.

Desirably, each of the at least one movable wall comprises a hydraulic actuator for moving the wall, wherein the controller controls each hydraulic actuator for compressing the crop material in the direction transverse to the propelling movement; and for influencing the position of the at least one movable wall. The predetermined limited compression reduction is realized by controlling the hydraulic actuator.

Desirably, the hydraulic actuator is provided with a release mechanism to reduce the hydraulic pressure on the actuator, thereby reducing the compression force and reducing the counter pressure, the release mechanism operationally connected to the controller. Further desirably, the hydraulic actuator is further provided with a restore mechanism to restore the hydraulic pressure on the actuator, a predetermined time after the pressure is released via the release mechanism to increase the compression force and to restore the counter pressure, the restore mechanism being operationally connected to the controller. In this configuration, the controller is connected to a release mechanism and a restore mechanism. At the predetermined moment of power movement the release mechanism can be triggered to reduce the counter pressure, such that the propelling through the baling chamber of the bale can be initialized more easily. After the propelling has been initialized, the controller desirably controls the restore mechanism such that the counter pressure generated by the at least one movable wall is restored. The restore mechanism is triggered a predetermined time after the above mentioned predetermined moment of the power movement, such that counter pressure is reduced over the above mentioned predetermined limited period of time.

Desirably, the restore mechanism and the release mechanism are cooperatively dimensioned such that a reduction of hydraulic pressure of the release mechanism can be compensated by a restoration of hydraulic pressure by the restore mechanism. Such dimensioning allows the release and restore mechanism to cooperate in an optimal manner.

Desirably, the controller is adapted to activate the release mechanism when the bale reaches the predetermined density and to activate the restore mechanism after the bale has started the propelling movement. By activating the release mechanism when the bale reaches the predetermined density, the density of the bale is accurately controllable. Furthermore, this allows easy initialisation of the propelling movement of the bale. Due to this easy initialisation of propelling movement, the force which is exerted by the plunger on the bale can be reduced while keeping the bale within a predetermined density range.

According to a second embodiment, a pressure influencing mechanism is provided for each of the at least one movable wall to influence the pressure exerted by the wall. More desirably, each pressure influencing mechanism comprises an actuator adapted for temporarily releasing pressure exerted by the wall. Further desirably, the actuator is an electric, pneumatic or hydraulic actuator optionally connected to the at least one movable wall via a lever. By providing an electric actuator via a lever as pressure reduction mechanism, pressure can be reduced and restored fast. This can be done independent from the positioning of the movable wall. According to the second embodiment a faster working system can be obtained. The hydraulic actuator that actuates the at least one movable wall is adapted to exert high forces, is therefore typically big and is therefore further typically slow working. In the second embodiment, desirably the mechanical pressure influencing mechanism is provided between each of the at least one movable wall and corresponding hydraulic actuator. The hydraulic actuator actuates the at least one movable wall and exerts the predetermined force. At the moment where the pressure release is desired, the mechanical pressure influencing mechanism is activated and the pressure is released for a short period of time. Further details regarding embodiments are given in the detailed description.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION OF THE DRAWINGS

The prior art baling machine or baler shown in FIGS. 1-4 is configured to be pulled over a field and driven by a tractor (not shown). Alternatively, the baler could be self-propelled and/or self-driven.

Figure 1:
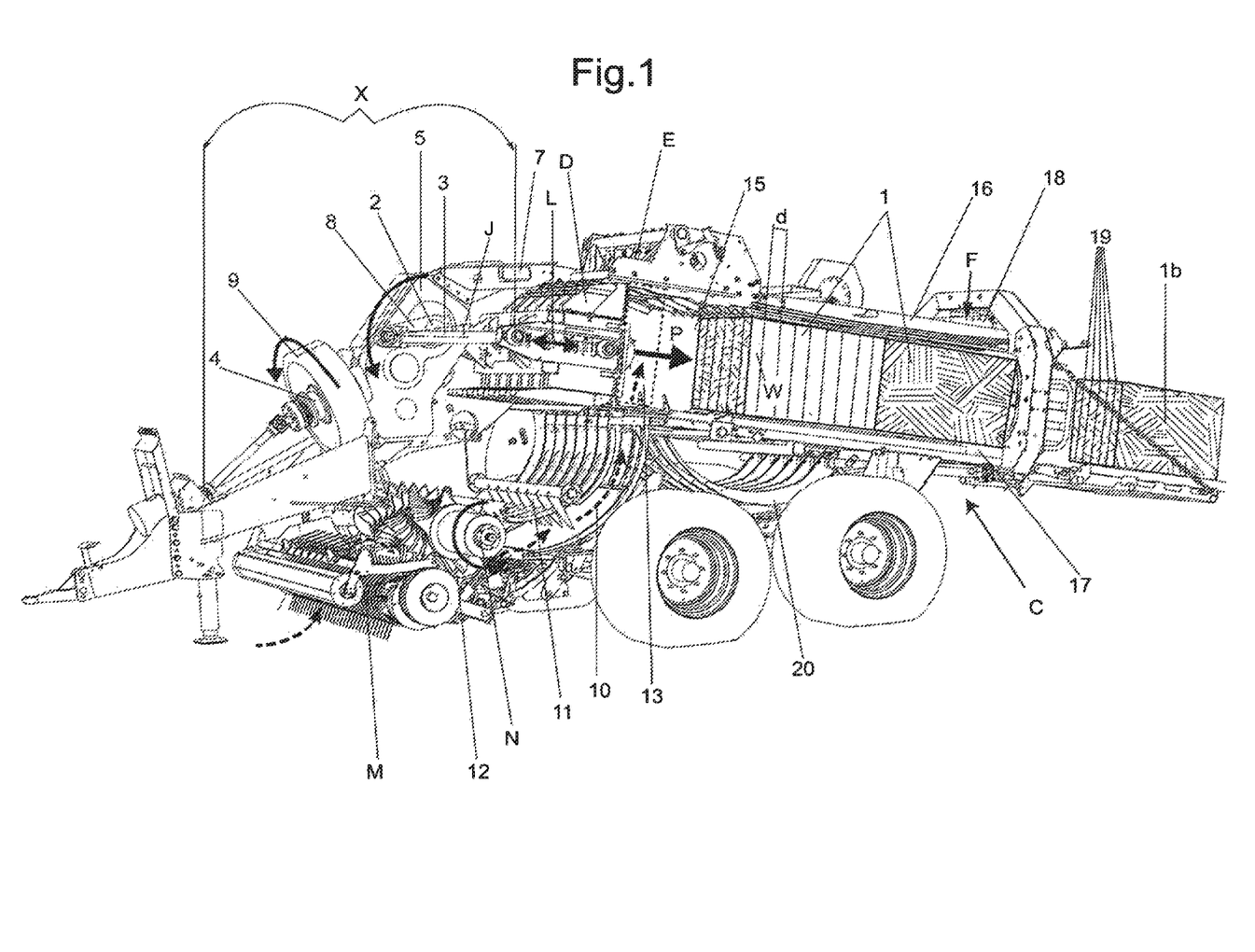
FIG. 1 illustrates a baler according to an embodiment of the invention.

The baler includes a baling chamber C and a plunger D that can be driven into the baling chamber C in a reciprocating manner. The baling machine also includes a pick up mechanism M for picking up cut bale material such as grass and straw from the ground, a feed mechanism N for feeding the bale material into the baling chamber C and a driveline X for transmitting drive to the plunger D from the drive output of a towing vehicle (not shown). These components are all conventional and are not described in further detail. The baling machine also includes a binding device E for binding the bale with binding twine. This binding device may be any conventional binding device and is therefore not described in further detail.

The baling chamber C comprises an open ended bale-forming channel A through which compressed bale material 1 is forced by the reciprocating plunger D. In this example, the plunger D is driven from a rotating drive axle 2 via a crank 8 and the plunger rod 3. The drive axle 2 comprises an output shaft of a drive gearbox 5 that also has a driven input shaft 4 through which it receives drive from the drive output of a towing vehicle (not shown). The gearbox 5 is mounted on a frame 7 of the baling machine. The drive input shaft carries a large flywheel 9 for smooth operation of the baler.

Typically the material to be baled is taken up from the ground by the pick-up device M. The feed device N feeds the material to an intermediate material buffer 10. The feed device N may be equipped with knives 12 for cutting up the material to be baled. When sufficient material has collected in the intermediate buffer 10, a stuffer 11 forwards the material into the bale chamber C in front of the plunger D. The material is then ready to be compressed.

The open ended channel A that forms the baling chamber C has an inlet end 13 and an outlet end 14. The bale-forming channel A is defined by two side panels 15 (one of which has been omitted in FIG. 1 to show the interior of the baling chamber C), a top panel 16 and a bottom panel 17. The top panel 16 (and/or one or both of the side panels 15) may comprise an adjustable panel that is pivotable about its upstream end allowing the cross-sectional area of the bale-forming channel A to be adjusted. An adjusting mechanism 18 for adjusting the position of the adjustable panel 16 is provided towards the outlet end 14 of the baling chamber C. The adjusting mechanism 18 applies a biasing force F to the adjustable panel 16, to control the level of friction between the panel and the compressed material 1 in the baling chamber C. The adjustable panel 16 thus comprises a friction control element.

The plunger D is driven in a substantially linear direction L in the longitudinal direction of the baling chamber between two end positions comprising respectively a withdrawn position (FIG. 2) in front of the baling chamber C and an extended position (FIG. 4) in which it extends into the channel A of the baling chamber C. When the plunger is in the withdrawn position (FIG. 2) the baling chamber C is loaded with the bale material to be compressed. The plunger D is then driven into the baling chamber so that this new bale material is first shifted into contact with a body of compressed material 1 already in the baling chamber C and then compressed against that body of material. The newly compacted material forms a wad W that is added to the already compacted material 1 in the channel A. The friction of the compressed material 1 with the panels 15, 16, 17 of the baling chamber C provides a resistive force allowing for compression of the new material that is introduced into the baling chamber C in front of the plunger D. Each of the panels 15, 16 and 17 may comprise an adjustable panel allowing the cross-sectional area of the bale-forming channel A to be adjusted. Alternatively, the complete panels 15, 16 and 17 are adjustable and pivotally connected to a baler frame allowing the cross-sectional area of the bale-forming channel A to be adjusted. In both situations, these panels 15, 16 and 17 can be considered as movable wall. Via these movable walls, friction can be controlled.

After compression, continued movement of the plunger D drives the wad W of newly compressed material and the compressed material 1 already in the baling chamber C towards the outlet end 14 of the baling chamber until the plunger D reaches its fully extended end position. The plunger D then returns in the opposite direction to its withdrawn position so that the baling chamber C can be reloaded with new material to be compressed. The plunger therefore performs a compression cycle that consists of a compression stroke followed by a return stroke. This compression cycle is repeated continuously until the baling process is finished.

A bale 1b is formed from the compressed material in the baling chamber and bound with twines 19 that are looped around the body of compressed material in order to hold it in compression after leaving the baling machine. This binding process can be performed as follows.

At the start of the baling process two lengths of twine from spools (not shown) on opposite sides of the baling chamber C are connected to one another by tying the ends of the twines together using the binding device (or knotter) E. As the bale material is compacted in the baling chamber C the spools feed twine to the baling chamber C on either side of the bale material. On one side of the baling chamber C the twine passes through the tip of a baling needle 20. When the body of compressed bale material 1 has reached its full length, between two successive compressing strokes, the needle 20 brings the twine as a loop to the other side of the baling chamber C. The knotter E then knots the twine, joining an end of the twine loop that was brought around the compressed bale by the needle 20 to an end of the twine that was supplied by the spool on other side of the baling chamber (the same side as the knotter device E). The needle 20 is then retracted and a new bale is started.

Figure 3:
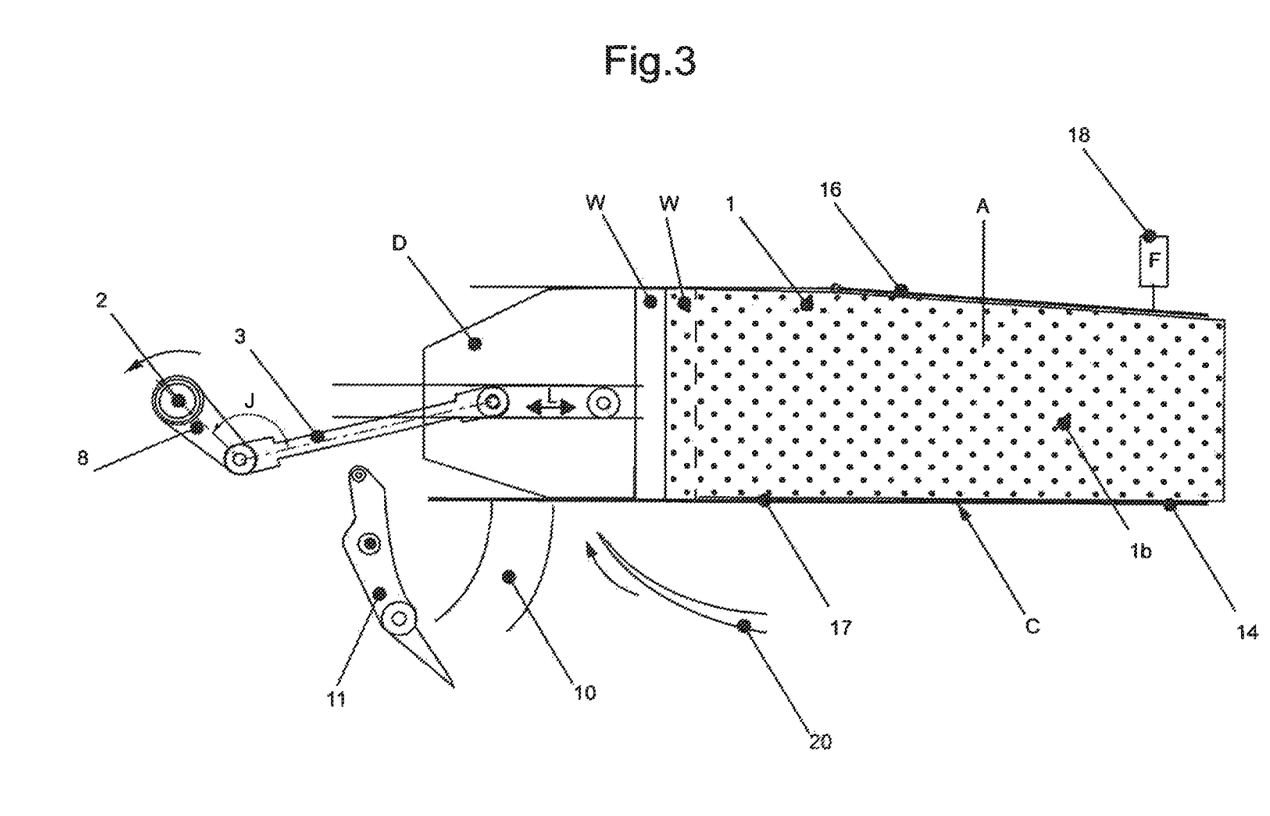
FIG. 3 shows a schematic side view with the plunger in an intermediate position.

During a compression cycle, the force exerted by the plunger D is typically at a maximum at the moment when the newly fed bale material has been compressed and the bale material 1 already in the channel A starts to shift backwards (FIG. 3). At this moment the plunger is at a distance about equal to the wad thickness d from the extended end position of the plunger. During the shifting of the compressed material the plunger force will remain at a level that is slightly lower than the maximum force.

The maximum plunger force of the baling machine is limited by the maximum allowable drive torque of the drive train. This maximum drive torque will provide a maximum plunger force that varies with the position of the crank. For example, if the gearbox 5 has a maximum drive torque of 90.000 Nm and the crank 8 has a length of 360 mm, the maximum plunger force will be about 250.000 N when the angle J between the crank 8 and the rod 3 is about 90 degrees, and about 750.000 N when the angle J between the crank and the rod is 160 degrees.

The invention describes a method and apparatus that reduces the torque required for the drive line of a baler, thereby allowing an increase in the density of the bale without having to strengthen the gearbox.

Figure 2:
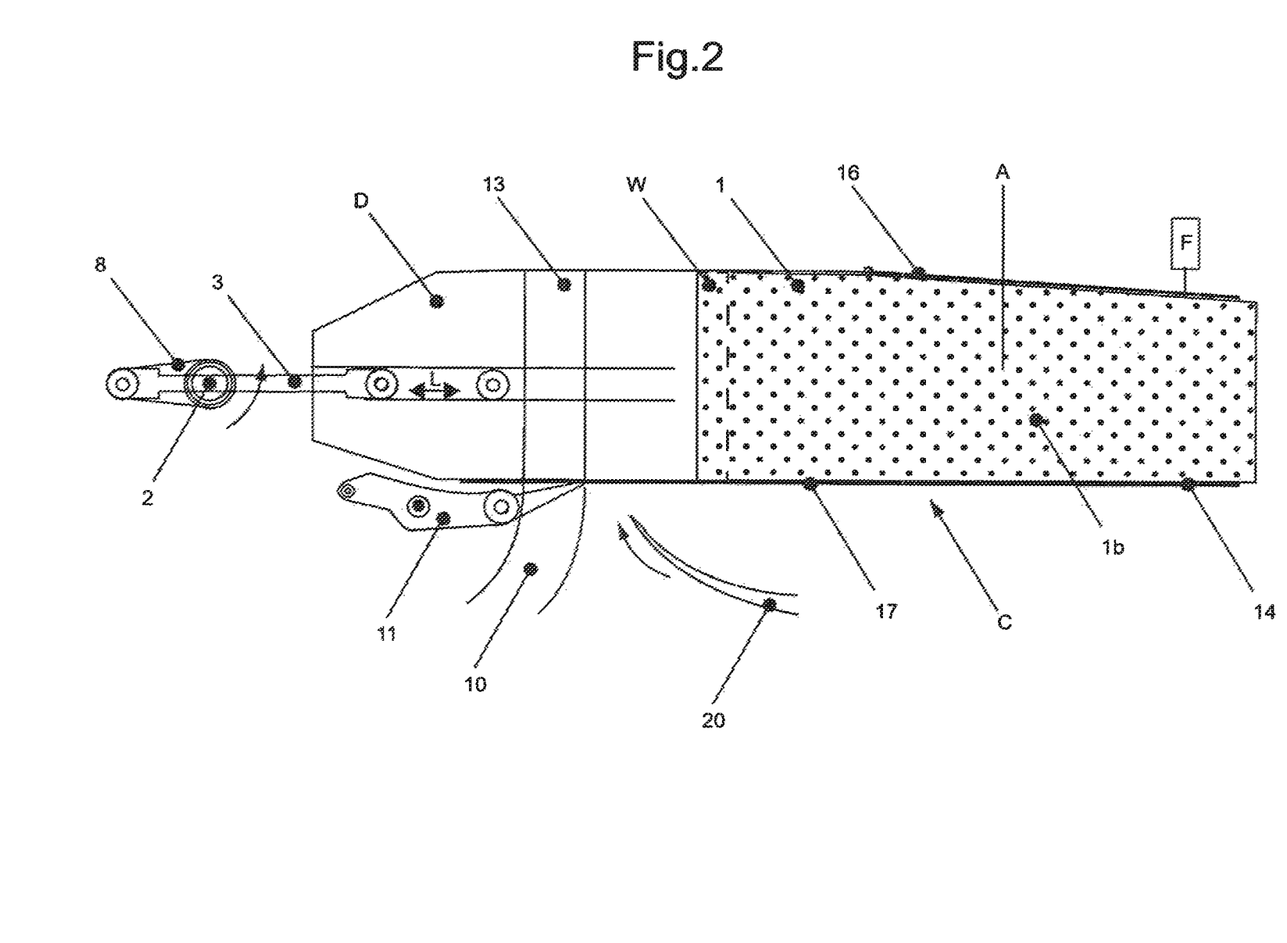
FIG. 2 shows a schematic side view with the plunger in the retracted position.
Figure 4:
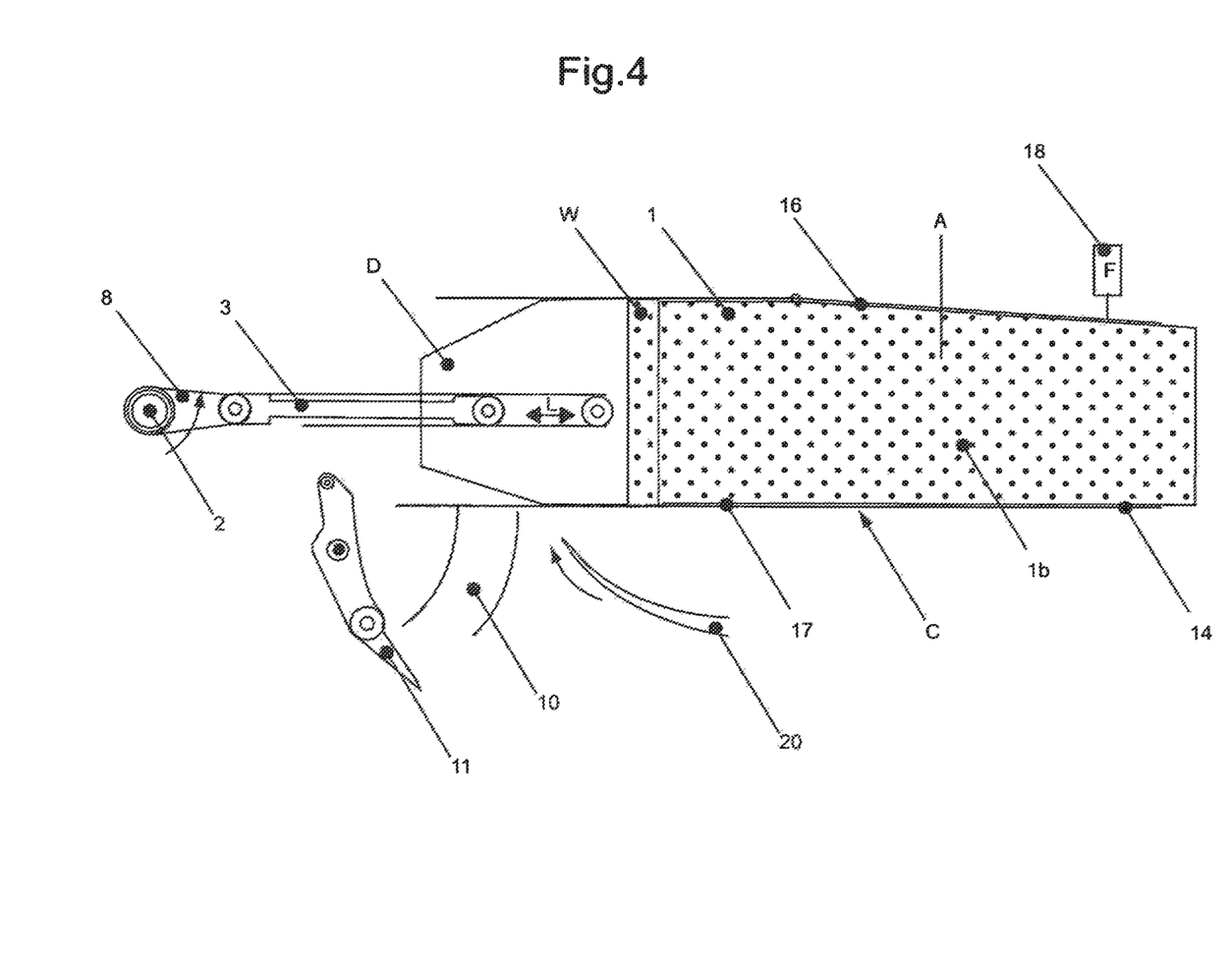
FIG. 4 shows a schematic side view with the plunger in the extended position.
Figure 5:
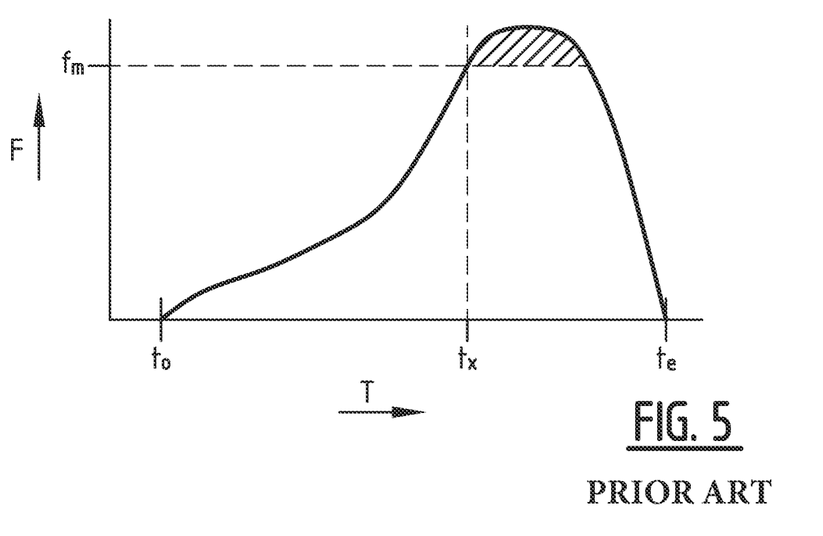
FIG. 5 shows a graph of the power through the plunger drive system according to the prior art.

FIG. 5 shows a graph wherein the power transmitted through the plunger drive mechanism is shown during the power movement of the compression cycle. In particular, FIG. 5 shows a force F exerted by the rotating drive axle 2 to the plunger D over a time period T of the power movement. The graph starts at time to, which corresponds to the start of the power movement, wherein the plunger is in its retracted position as shown in FIG. 2. FIG. 5 shows the force graph up to the end of the power movement, indicated as time $t_e$. Time $t_e$ corresponds to the end of the power movement, wherein the plunger D is in its most extended position as is shown in FIG. 4. The intermediate position $t_x$ corresponds to an intermediate position of the plunger, as is shown in FIG. 3.

The invention is based on the insight that when a slice of crop material is introduced in the baling chamber, a first part of the power movement of the plunger D, being the part which is shown in FIG. 5 between $t_0$ and $t_x$, compresses the newly introduced slice thereby increasing the density while the compacted material 1 inside the baling chamber stands still. It will be clear that standing still relates to the relative position of the baling chamber and the compacted material 1. Tests and measurements have found that the density of the newly introduced slice of crop material is not significantly increased anymore during the second part of the power movement, being the part in FIG. 5 between $t_x$ and $t_e$. From a density point of view, the force F needed to obtain a bale with a predetermined high density is shown in FIG. 5 as force $f_m$. The graph of FIG. 5 illustrates that $f_m$ is not the maximum force F that is exerted by the rotating drive axle 2. In FIG. 5, the shaded part of the graph shows that the force F further increases during the second part of the power movement. Despite further increasing of the force F, the density of the compacted material 1 is not significantly increased. Hence, from a density point of view, the force F during the power movement which is above the force $f_m$ serves no purpose.

Tests and simulations have revealed that initializing the propelling movement of the compacted material 1 through the baling chamber requires a high effort. This high effort reflects in the increasing force F shown in FIG. 5 after the point $t_x$. This force increase can be theoretically explained by the static friction coefficient being higher than the dynamic friction coefficient. Hence, initiating the propelling of the compacted material 1 through the baling chamber requires a higher force than the propelling itself.

The agricultural market is interested in agricultural balers wherein the bales are bigger and have higher densities than currently available. Therefore, so-called high density balers are designed. A high density baler is defined as a baler aiming to produce a large bale with high density. This high density is defined as a density of about 240 kg/m$^3$, which is the optimal density for transporting the bales over public roads in Europe. This is based on Miao et at, (2013), Energy and pressure requirement for compression of *Miscanthus giganteaus* to an extreme density; Biosystems Engineering 114 (1), 21-25. During designing of a high density baler it was taken into account that, the forces transmitted through the baler, at different places of the baler, also increase. The force increase could be handled by strengthening the respective elements. However, the present invention is based on the insight that the plunger force can be reduced without affecting the density of the bale.

Figure 6:
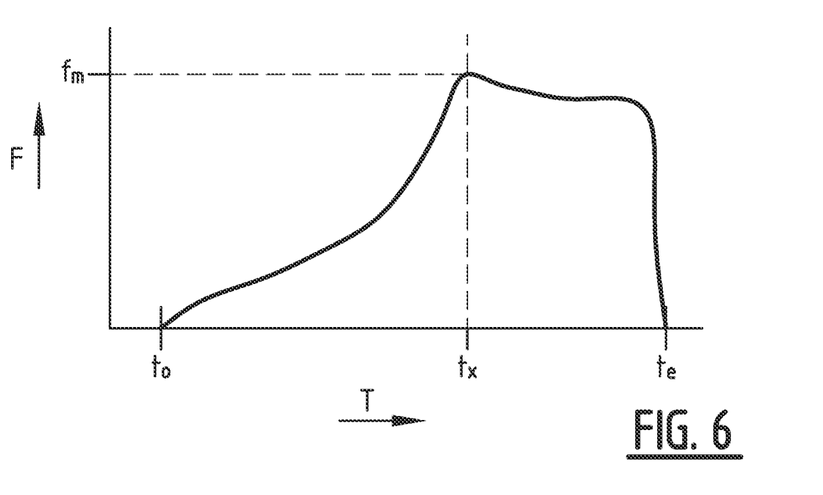
FIG. 6 shows a graph of the power through the plunger drive system according to the invention.

According to the invention, the position of the at least one movable wall 15, 16, 17 is adjusted to temporarily and/or instantaneously reduce the lateral pressure on the compressed material 1. This reduction aims to reduce the static friction between the compressed material and the side walls of the baling chamber. Since the static friction is reduced, by reducing the lateral force, the force F to be exerted by the plunger D to initiate the propelling of the compacted material 1 through the baling chamber is also reduced. The effect is shown in FIG. 6. FIG. 6 shows a graph similar to the graph of FIG. 5, but wherein the position of the movable walls are adjusted, decreasing the pressure between the movable walls and the compacted material, at time $t_x$. The effect can be clearly seen in FIG. 6. By reducing the transverse pressure on the compacted material 1, initiating the propelling of the compacted material 1 through the baling chamber requires less force. As a result, the force peak which is shaded in FIG. 5, is not present in FIG. 6. The maximum force exerted by the rotating drive axle 2 corresponds to the force $f_m$ needed to reach the predetermined bale density. The skilled person will understand that this is an optimal situation wherein forces and particularly force peaks are directly related to the main purpose of the device. In other words, the highest force $f_m$ transmitted through the rotating drive axle towards the plunger D directly relates, and is used to reach the final density of the compressed material 1.

Figure 7:
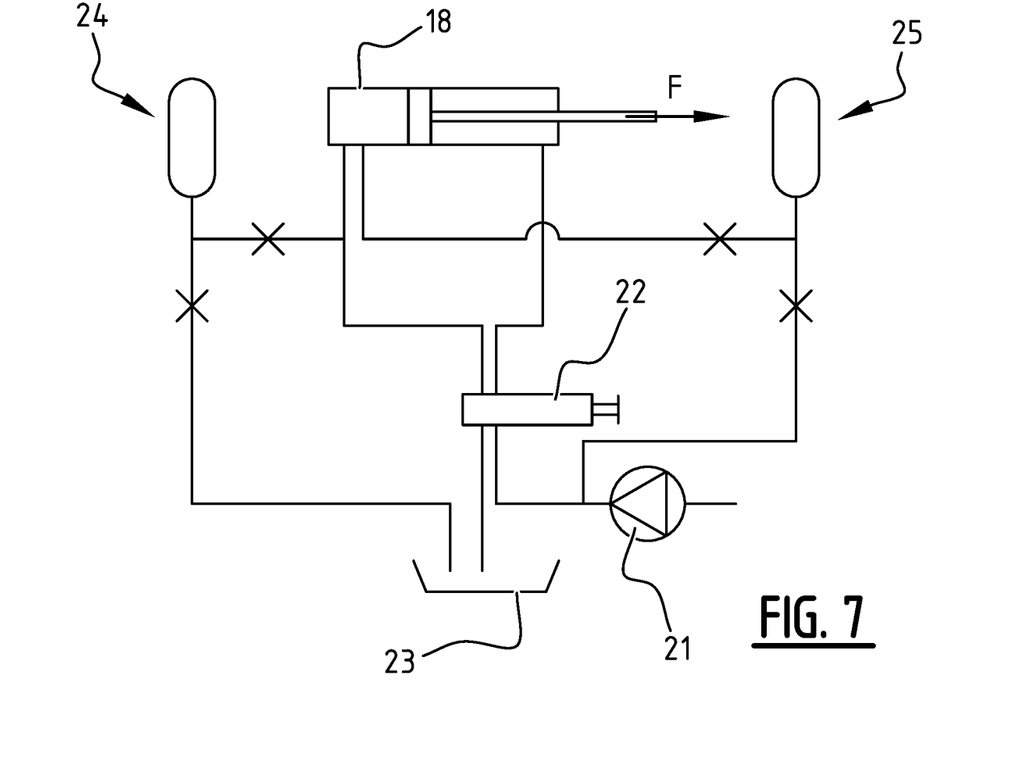
FIG. 7 illustrates a first embodiment of the present invention.
Figure 8:
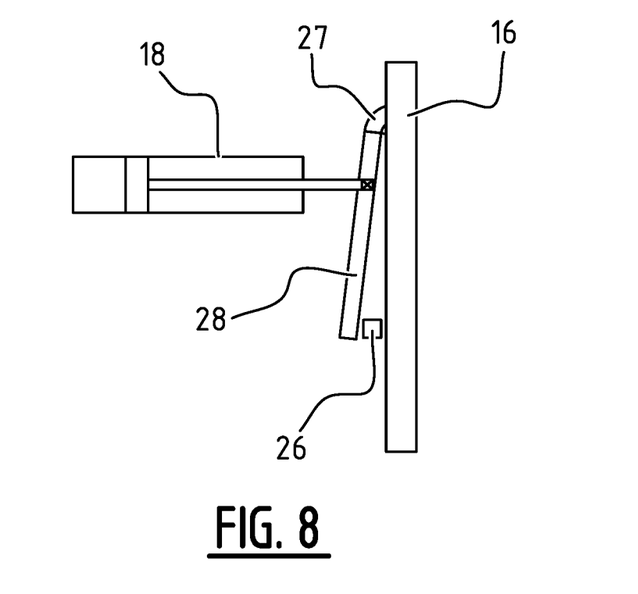
FIG. 8 illustrates a second embodiment of the present invention.

FIGS. 7 and 8 show different embodiments for temporarily adjusting the position of the at least one movable wall. The position of the at least one movable wall is controlled by an adjusting mechanism 18. The adjusting mechanism 18 is typically a hydraulic actuator. In practice, one or multiple actuators 18 can be used for each movable wall. Alternatively, a single actuator or a combination of actuators 18 is used to control the combined position and/or the relative position of multiple movable walls. The skilled person will understand how the features of the embodiments shown in FIGS. 7 and 8 can be applied and/or redesigned for each situation.

FIG. 7 shows the hydraulic actuator 18. This hydraulic actuator 18 is connected via a valve 22 to a hydraulic pump 21 and to an oil reservoir 23. This is a simplified setup illustrating that the hydraulic actuator 18 can be primarily controlled in a traditional manner. The skilled person will recognize that more advanced controlling setups and/or schemes can be used to control the hydraulic actuator 18. In this context, it is noted that the hydraulic actuator 18 aims to control the position of the at least one movable walls and to control the force F applied by the at least one movable wall to the compressed material 1. This force F is considered, for the sake of simplicity, to be applied transverse to the propelling direction.

FIG. 7 further shows a pressure release mechanism 24 and a pressure restore mechanism 25. The pressure release mechanism is in the embodiment of FIG. 7 formed by an accumulator connected to a pressurized chamber of a hydraulic actuator 18 via a first valve, and connected to the oil reservoir 23 via a second valve. By closing the first valve and opening the second valve, the accumulator can be emptied into the oil reservoir. After emptying, the two valves are closed keeping the accumulator in the empty state and allowing pressure in the pressurized chamber of the actuator 18 to be increased. At this moment, the pressure in the pressurized chamber is significantly higher than the pressure in the accumulator. During the power movement of the plunger D, at time $t_x$, the valve between the accumulator and the pressured chamber of the actuator 18 is opened so that a predetermined amount of pressure is released from the pressured chamber of the actuator 18 into the accumulator of the pressure release mechanism 24. When a predetermined pressure is reached in the accumulator of the pressure release mechanism 24, the valves of the pressure release mechanism 24 can be closed again and the cycle can restart. The skilled person will understand that this setup allows a quick release of pressure from the actuator 18. Also, a predetermined amount of pressure can be released, which amount is set by selecting and/or adapting the accumulator.

In FIG. 7, a pressure restore mechanism 25 is also illustrated. The pressure restore mechanism 25 has an equivalent setup with the pressure release mechanism 24. The pressure restore mechanism 25 also comprises a hydraulic accumulator with two valves, one valve connecting the accumulator to the hydraulic pump so that pressure can be built up in the accumulator of the restore mechanism 25 via the hydraulic pump and a second valve connecting the hydraulic accumulator 25 to the pressurized chamber of the actuator 18. The pressure restore mechanism operates with the following sequence of steps. First, the valve towards the hydraulic pump 21 is opened while the other valve towards the actuator 18 is closed. This allows pressure to be built up in the accumulator of the restore mechanism 25. A predetermined pressure has been built up in the accumulator, all valves are closed and the pressure restore mechanism 25 is considered loaded and ready to restore the pressure.

When the pressure is to be restored, typically a predetermined period of time after the pressure has been released, referring to FIG. 6, the restore mechanism will typically be triggered somewhere between time $t_x$ and time $t_e$. Most desirably, the pressure restore mechanism is triggered after the propelling of compressed material has been initiated. This means when the bale is moving through the baling chamber. When the pressure restore mechanism is triggered, the valve between the pressurized chamber of the actuator 18 and the accumulator is opened so that the pressure which is built up in the accumulator after the restore mechanism 25 is at least partially transferred to the pressurized chamber of the hydraulic actuator 18. Based on this description, the skilled person will understand that the pressure restore mechanism provides a fast working setup to increase or restore the pressure in the pressurized chamber of the actuator 18. The pressure restore mechanism 25 is particularly used when the existing mechanism to control the actuator 18 appears to be ineffective, for example too slow, to restore the pressure in the pressurized chamber.

The skilled person will understand that the pressure release mechanism 24 and the pressure restore mechanism 25 can be designed in a balanced manner such that the pressure released from the actuator via the pressure release mechanism can be at least largely compensated for by the pressure restored to the actuator 18 by the restore mechanism 25.

FIG. 8 shows a further embodiment wherein a pressure influencing mechanism 26 is mounted as an intermediate element between the actuator 18 and the at least one movable wall. The skilled person will understand that the pressure influencing mechanism can equally be connected as an intermediate between the actuator 18 and the frame of the agricultural baler.

The pressure influencing mechanism 26 is connected via a lever 28 and a hinge 27 to the movable wall 16. The element 26 is desirably a hydraulic, electric or otherwise powered actuator. Via the lever 28, the actuator 26 can adjust the position of the movable wall thereby reducing the pressure exerted on the compressed material 1. Via the actuator 26 and the lever 28, the position of the movable wall, and hence the pressure exerted on the compressed material 1 can also be restored. In the embodiment of FIG. 8, the actuator 18 can be controlled in a conventional way and the adjusting mechanism is provided as a separate system. The embodiment of FIG. 8 mainly aims to be able to execute a small and fast change of position of the movable walls. Small and fast being considered relative to the conventional movement of the movable walls. In this context, a movement of doors within 1 plunger cycle is considered. A small movement is defined as a movement of about 0.5 cm. A fast movement is defined as a movement during about 0.3 seconds.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. An agricultural baler comprising:
a baling chamber; and
a pre-compression chamber configured to gather crop material and to periodically form a slice of the crop material and introduce the slice towards the baling chamber into a first segment of the baling chamber,
wherein the baling chamber comprises:
  a plunger provided for reciprocally moving in the baling chamber, the reciprocal movement having a power movement and a retraction movement, wherein in use, during the power movement, slices of the crop material are compressed into a bale and the bale is pushed through the baling chamber;
  at least one movable wall for exercising a compression force to the crop material in a direction substantially transverse to a propelling movement so that, in use, the at least one movable wall provides a counter pressure for a propelling through the baling chamber of the agricultural baler; and
  a controller configured to influence the compression force at a predetermined moment of the power movement to reduce the counter pressure such that a force peak is not applied by the plunger, wherein the predetermined moment is related to a moment where the power movement initiates the propelling through the baling chamber of the bale, and wherein the predetermined moment occurs at a predetermined time during the power movement before the plunger can reach a maximum plunger force calculated as a function of a maximum drive torque of a drive means that reciprocates the plunger;
wherein the agricultural baler further includes:
  (a) a hydraulic actuator and a release mechanism, the hydraulic actuator being configured for moving the at least one movable wall, the release mechanism being formed as an accumulator and configured to reduce a hydraulic pressure on the hydraulic actuator thereby reducing the compression force and reducing the counter pressure; or
  (b) an actuator and a pressure influencing mechanism, the actuator being configured for moving the at least one movable wall, the pressure influencing mechanism being configured to influence a pressure exerted by the at least one movable wall and being between the at least one movable wall and the actuator.

2. The agricultural baler according to claim 1, wherein the predetermined moment is related to a moment where a density of the slices of crop material into the bale reaches a predetermined value.

3. The agricultural baler according to claim 1, wherein the compression force is influenced by reducing the compression force over a predetermined limited period of time with a predetermined limited compression reduction.

4. The agricultural baler according to claim 1, wherein the at least one movable wall comprises the hydraulic actuator for moving the each of the at least one movable wall, wherein the controller controls the hydraulic actuator:
  for compressing the crop material in the direction transverse to the propelling movement; and
  for influencing a position of the at least one movable wall.

5. The agricultural baler according to claim 4, wherein the release mechanism is operationally connected to the controller.

6. The agricultural baler according to claim 5, further comprising a restore mechanism to restore the hydraulic pressure on the hydraulic actuator at a predetermined time after the pressure is released via the release mechanism to increase the compression force and restore the counter pressure, the restore mechanism being operationally connected to the controller.

7. The agricultural baler according to claim 6, wherein the restore mechanism and the release mechanism are cooperatively dimensioned such that a reduction of hydraulic pressure of the release mechanism can be compensated by a restoration of hydraulic pressure by the restore mechanism.

8. The agricultural baler according to claim 5, wherein the predetermined moment is related to the moment where a density of the slices of crop material into the bale reaches a predetermined value, and wherein the controller is configured to activate the release mechanism when the bale reaches the predetermined density and to activate the restore mechanism after the bale has started the propelling movement.

9. The agricultural baler according to claim 1, wherein the actuator is adapted for temporally releasing pressure exerted by the at least one wall.

10. The agricultural baler according to claim 9, wherein the actuator is an electric, pneumatic, or hydraulic actuator.

11. The agricultural baler according to claim 10, further comprising a lever.

12. The agricultural baler according to claim 9, wherein the at least one movable wall comprises the actuator for moving the at least one movable wall, the actuator being a hydraulic actuator, wherein the controller controls the hydraulic actuator:
  for compressing the crop material in the direction transverse to the propelling movement; and
  for influencing a position of the at least one movable wall.

13. The agricultural baler according to claim 1, wherein the drive means is a gearbox that reciprocates the plunger.

14. The agricultural baler according to claim 1, wherein the predetermined moment occurs at the predetermined time during which density of the compressed crop material does not increase despite further advancement of the plunger during the power movement.

15. The agricultural baler according to claim 1, wherein the maximum plunger force is calculated as a function of the maximum drive torque, a length of a crank that is rotatably connected to the plunger, and an angle that is defined between the plunger and the crank.

* * * * *